Patented Jan. 8, 1929.

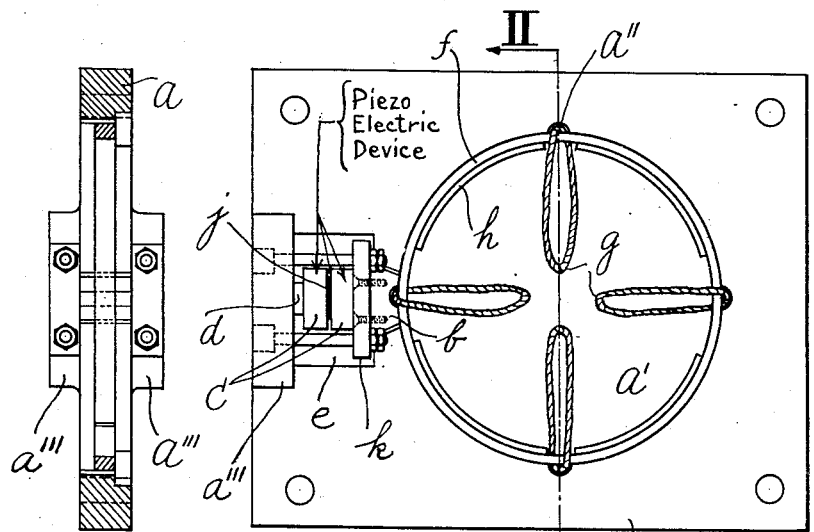
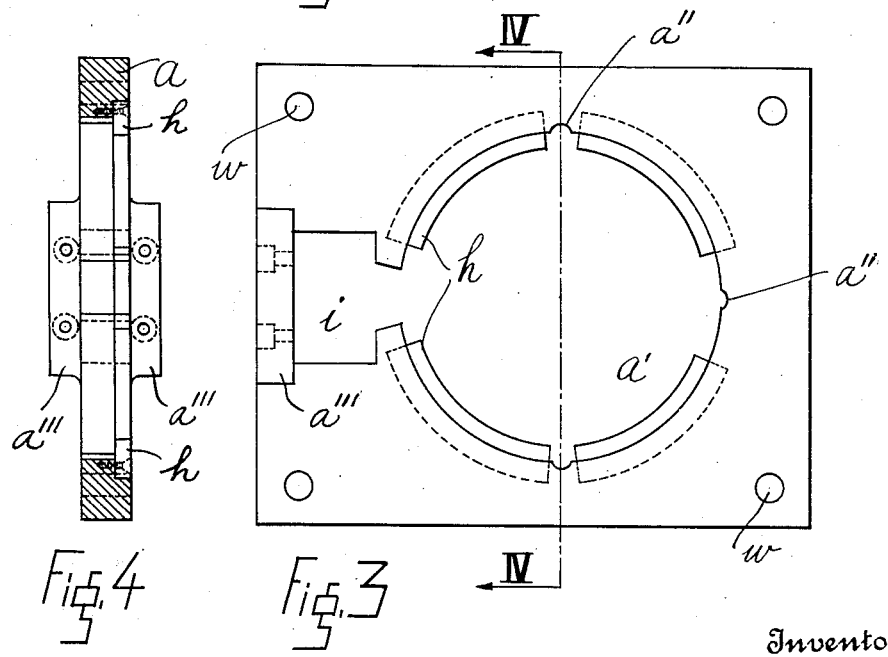

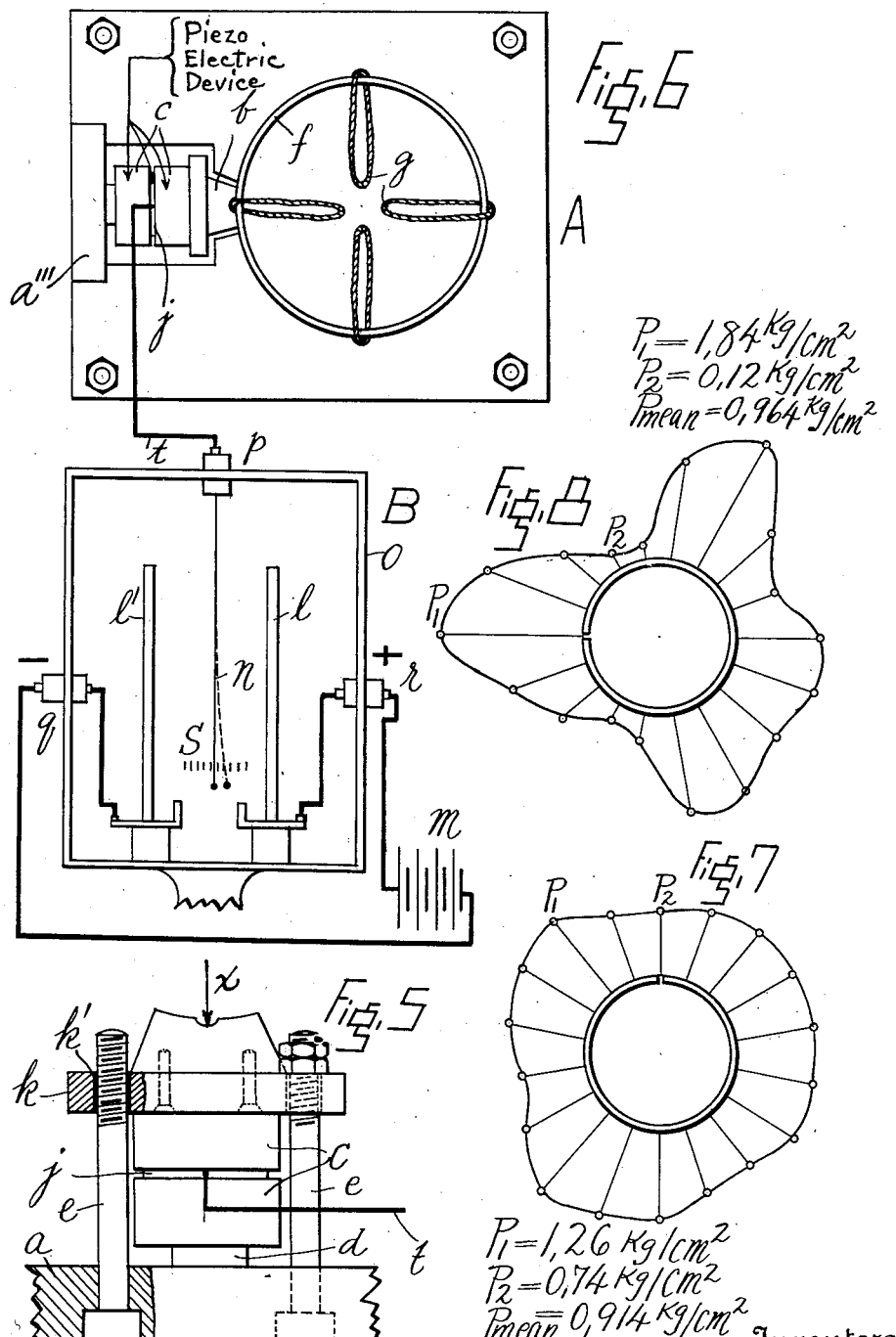

1,698,200

UNITED STATES PATENT OFFICE.

MASATOSI OKOCHI AND KEIKICHI EBIHARA, OF TOKYO, JAPAN, ASSIGNORS TO ZAIDAN HOJIN RIKAGAKU KENKYUJO, OF TOKYO, JAPAN.

APPARATUS FOR MEASURING PRESSURE OF PISTON RINGS.

Application filed August 3, 1926, Serial No. 126,917, and in Japan May 16, 1926.

This invention relates to an apparatus for measuring pressure of a piston ring exerted on the inner wall of a cylinder for which the ring is to be used. The direct object of the invention is to measure such pressure all along the circumferential length of the ring and accordingly to obtain a distribution curve of the pressure between the ring and the cylinder, so that, a more efficient ring exerting uniform pressure on the wall of the cylinder may be manufactured.

In the accompanying drawings,

Fig. 1 shows a plan view of the main part of the new measuring apparatus according to the invention;

Fig. 2 is a sectional view of the apparatus shown in Fig. 1 along the line II—II looking in the direction of arrows;

Fig. 3 is a plan view of a disc employed in this invention;

Fig. 4 is a sectional view of the disc shown in Fig. 3 along the line IV—IV, looking in the direction of arrows;

Fig. 5 is a detailed plan view of the attachment of a piezo-electric device to the disc;

Fig. 6 is a diagrammatic plan view of the new apparatus according to the invention; and Figs. 7 and 8 are two examples of pressure curves obtained by the new apparatus of this invention.

In Figs. 1 to 5, $a$ is a thick disc made of a proper metal, say, preferably steel, and provided with a shallow cylindrical bore $a$, the inner diameter of which corresponds to that of an engine cylinder for which the piston ring is to be used, and which is therefore made very accurately. $b$ is a small separate piece made of the wall material such as cut apart from the disc material and can be detachable from a space of conforming shape provided in the disc, the inner wall of the piece $b$ forming a part or continuation of the cylindrical wall of the bore $a'$. $c$ and $c$ are two small blocks of piezo-electric substance, for instance quartz or tourmaline, and between which a thin copper plate $j$ is inserted. $d$ is a thin metallic plate, say, steel plate, serving as a distance piece. $k$ is a clamping member made in one piece with the piece $b$ or rigidly connected thereto. These parts $b$, $k$, $j$, $c$ and $d$ are clamped together by means of four clamping screws $e$ fitted in flanges $a'''$ on the disc as will be understood from Fig. 5. As aforesaid, the inner wall of the movable piece $b$ is so shaped that it exactly conforms to the inner wall of the bore $a'$ and further, by the reasons hereafter described, the clamping force of the above part is so chosen that it is far greater compared with the pressure of a piston ring upon the inner wall of the bore. As there are provided ample annular gaps or clearances $k'$ between the outer surfaces of the clamping bolts or screws $b$ and the inner surface of the bolt holes provided in the clamping member, see Fig. 5, any pressure in a direction from the inside toward the outside, in the direction shown by an arrow $x$, can be freely transmitted to the piezoelectric substances through the parts $b$ and $k$, while the position of these parts clamped is maintained in relation to the wall of the bore because the clamping force is chosen so great as compared with the piston ring pressure that it is not affected by such increment of ring pressure and therefore the inner surface of the piece $b$ is also kept exactly in its originally adjusted position. This increment of pressure due to the piston ring however, sufficiently affects the piezoelectric substances $c$ and the copper plate $j$ is electrically charged, influencing an indicating device such as an electrometer according to the value of the pressure increment. To receive the clamped parts $b$, $k$, $c$, $j$, $d$ and $e$ a space $i$ is provided in the disc. Also, for the convenience of handling the piston ring $f$ in the bore, several shelves $h$ are fitted to the lower end of the bore to support the ring thereon. $a''$ are small recesses made in the wall of the bore at intervals between the shelves $h$ to receive ropes $g$ around the ring. The use of the ropes $g$ will be hereinafter fully explained.

In Fig. 6, A shows diagrammatically the main parts of the apparatus shown in detail in Figs. 1 to 5, while B shows an electrometer as one example of means for measuring piezo-electricity produced by the variation of pressure between the parts $c$ and $j$ due to the increment of piston ring pressure upon the inner surface of the piece $b$, the parts A and B being connected electrically. In this figure, O is a glass box provided with three terminals, one of which $p$ is connected to the copper plate $j$ by a wire $t$, while the two others $r$ and $q$ are respectively connected to positive and negative poles of a source of electricity or a cell $m$ as shown. $l$ and $l'$ are two poles of the meter respectively connected to $r$ and $q$, while $n$ is an elastic metallic needle connected to the pole $p$ and normally positioning at the center between the two poles $l$ and $l'$, $s$ is a graduated scale suitably arranged inside the box. The free end of this needle will deflect from neutral or center position by a certain angle to right as shown according to the magnitude of the increment of piston ring pressure affecting the pressure between the parts $c$ and $j$.

The working of the new measuring apparatus is as follows:

When a piston ring to be tested is inserted in the measuring apparatus, the ring is in a condition quite same as that when it is in a cylinder of an engine or of a compressor. A portion of this ring pushes the inner segment of the piezo electric devices of gauge, that is, the segment and crystals such as quartz plates, outwardly so that the quartz plates are subjected to a pressure and a piezo-electric charge is produced in proportion to the magnitude of the pressure. This charge is transmitted to the electrometer B by the lead wire $t$ and is measured thereby, the opposite side of the quartz plates being always earthed. Of course when charge caused by the ring pressure is first earthed and then the pressure exerted upon the quartz plates vanishes, a piezo-electric charge of reverse sign appears and it is preferable to employ the latter operation for measuring pressure of a piston ring.

Thus, supposing a piston ring is inserted in the apparatus, the segment of the piezo-electric gauge, and in turn the device itself, is subjected to a certain pressure, say F, of an arc element of the piston ring corresponding to an angle, say, at the center thereof. Here the piezo-electric pressure gauge is earthed to set the zero point of the needle of the electrometer. Next, one of the four ropes is pulled inward to separate said arc element of the piston ring from the segment of the piezo-electric gauge, so that the needle of the electrometer will deflect to opposite direction as there is produced a piezo-electric charge of opposite sign in the pressure gauge. The difference of the needle of this movement and that of the zero point before stated gives the actual deflection of the needle, and amount of this actual deflection is proportional to the diminished ring pressure. Therefore by fore-knowledge of the relation between known pressure given to the pressure gauge and the needle deflections, the absolute value F can be determined. By repeating the same operation for successive arc elements of the piston ring by rotating the ring step by step, the pressure of every part of the ring can be measured. Thus, for rotating the ring step by step the friction between the ring surface and the bore wall must be obviated, that is, the ring must be freed from the bore wall during the rotation. The four ropes are intended to obviate the said friction and for this purpose the ropes are slightly drawn toward the center of the bore during the rotation of the ring, the additional use of one special rope at the point of the pressure gauge is already stated.

Figs. 7 and 8 show two examples of the distribution curves of two actual piston rings measured by using the apparatus of this invention, and in which, the former shows that of the piston ring manufactured by the method of our U. S. application Serial No. 106,721, while the latter shows that of the ring supplied in the market by a certain famous maker.

We claim:

An apparatus for measuring the pressure of a piston ring exerted on a cylinder for which the ring is to be used, including a metallic disc having a cylindrical bore corresponding to the inner wall of the cylinder, said disc having a cut away portion communicating with the wall, a separate piece located in the cut away portion and having an inner surface conforming to the contour of the wall of the bore, a piezo-electric device clamped together with said separate piece, and a device for measuring piezo-electricity produced by the piezo-electric device according to the pressure exerted by the ring upon said separate piece.

In testimony whereof we affix our signatures.

MASATOSI OKOCHI.
KEIKICHI EBIHARA.